(12) United States Patent
Matthews

(10) Patent No.: US 9,727,055 B2
(45) Date of Patent: Aug. 8, 2017

(54) SYSTEM AND METHOD FOR VIDEO PROCESSING AND PRESENTATION

(71) Applicant: Alcatel-Lucent USA Inc., Murray Hill, NJ (US)

(72) Inventor: Kim Matthews, Watchung, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 62 days.

(21) Appl. No.: 14/674,393

(22) Filed: Mar. 31, 2015

(65) Prior Publication Data

US 2016/0291592 A1    Oct. 6, 2016

(51) Int. Cl.
*G05D 1/00* (2006.01)
*G06T 3/00* (2006.01)
*G06K 9/00* (2006.01)

(52) U.S. Cl.
CPC ....... *G05D 1/0038* (2013.01); *G06K 9/00791* (2013.01); *G06T 3/0012* (2013.01)

(58) Field of Classification Search
CPC .... G05D 1/0038; G06K 9/00791; B60R 1/00; B60R 2300/60; G06T 3/0012
See application file for complete search history.

(56) References Cited

U.S. PATENT DOCUMENTS

| 4,855,822 | A  | * | 8/1989  | Narendra | G05D 1/0038 348/114 |
| 8,640,020 | B2 |   | 1/2014  | Chen et al. | |
| 8,917,322 | B2 |   | 12/2014 | Olson et al. | |
| 2005/0265583 | A1 | * | 12/2005 | Covell | G06K 9/00369 382/106 |
| 2012/0249784 | A1 | * | 10/2012 | Olson | H04N 7/183 348/143 |
| 2015/0019043 | A1 | * | 1/2015  | Creasey | G05D 1/0038 701/2 |

* cited by examiner

*Primary Examiner* — Jerrah Edwards
*Assistant Examiner* — Kelly D Williams
(74) *Attorney, Agent, or Firm* — Niraj A. Desai

(57) ABSTRACT

Systems and methods for video processing and display are provided. In one aspect, a workstation is configured to determine a position of a remotely controlled vehicle when an image of the surroundings of the vehicle was captured, and to transform the image into a transformed image based on an estimated real-time position of the vehicle. In another aspect, a workstation is configured to identify an image captured prior to the time a remotely controlled vehicle changed its configuration. The workstation estimates a real-time position of the vehicle, and transforms the identified image into a transformed image based on the estimated real-time position of the vehicle, such that the transformed image represents at least a portion of a view of the surroundings of the vehicle at the estimated real-time position after the vehicle changed its configuration.

17 Claims, 4 Drawing Sheets

100

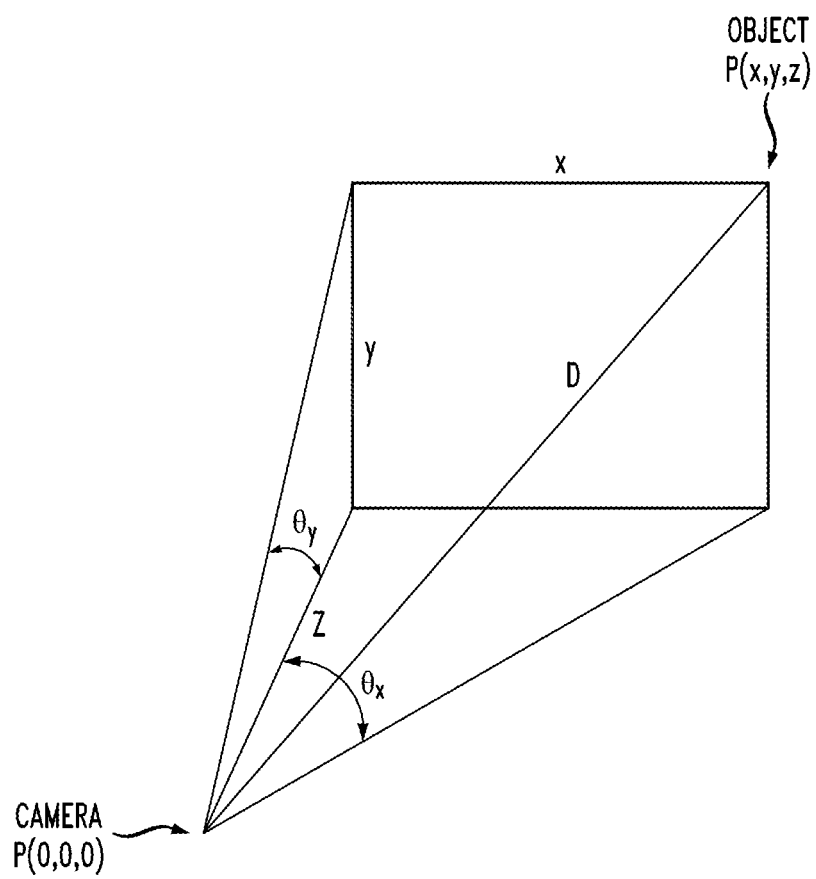

SYSTEM AND METHOD FOR VIDEO PROCESSING AND PRESENTATION

TECHNICAL FIELD

The present disclosure is directed towards video processing. More particularly, the present disclosure is directed towards systems and methods for processing and displaying video acquired from a remote camera mounted on a vehicle.

BACKGROUND

Video cameras provided for capturing images of the surroundings of a remotely controlled vehicle have a number of known applications. In typical cases, a suitable video camera is mounted on the body of a remotely controlled vehicle based on a desired point of view (POV), and the images of the surroundings are transmitted to a remote location from which the operator, from a far distance, is able to issue commands for remotely controlling the vehicle in its surroundings. The transmitted images are typically presented to the operator on a display, and the operator manipulates one or more controller devices such as, for example, a joystick, a steering wheel, a pedal, or any other suitable controller device or combination of controller devices, to remotely control or navigate the vehicle based on what the operator sees.

Some example applications include controlling or operating a vehicle in a disaster-struck or disaster-prone area, in a contaminated or toxic area, in a remote terrain, or in other environments hazardous to the operator. Other example applications include controlling or operating a small or miniature vehicle for exploring mines, buildings, or other space constrained areas. Increasingly, additional applications include hobbies (e.g., toy cars or unmanned aerial vehicles), transportation (e.g., driverless cars or trains), or other specialized activities such as snow or debris removal (e.g., snowplows, bulldozers).

One known issue that affects the operator's efficiency when remotely controlling a vehicle while viewing images of its surroundings is video latency, or the time interval between the time an image is acquired at the video camera attached to the vehicle and the time that that image is presented on a display to the operator at the remote location. Video latency depends on many factors, such as video encoding/compression times, decoding/decompression times, and network delays. Conventional approaches to this issue typically focus on provisioning the system to reduce the amount of the video latency. Some such approaches include, for example, reducing the image quality, increasing the network bandwidth, adding physical resources, and the like. While each of these approaches can advantageously improve one or more components that contribute to video latency, there is room for other types of improvements and approaches.

BRIEF SUMMARY

Systems and methods for processing and displaying video images received from a video camera mounted on a remote controlled vehicle are provided.

In one aspect, the system and method includes determining whether a new image captured by the video camera of the surroundings of the remotely controlled vehicle has been received.

If a determination is made that the new image of the surroundings has been received, the system and method further includes estimating the real-time position of the remotely controlled vehicle based on sensor data received from the vehicle; transforming the new image of the surroundings into a transformed image of the surroundings based on the estimated real-time position of the remotely controlled vehicle; and, outputting the transformed image of the surroundings for display to an operator of the remotely controlled vehicle.

If the new image of the surroundings has not been received, the system and method includes identifying a previously received image of the surroundings of the remotely controlled vehicle that was captured by the video camera; estimating the real-time position of the remotely controlled vehicle based on sensor data received from the vehicle; transforming the previously received image into a retransformed image based on the estimated real-time position of the remotely controlled vehicle; and, outputting the retransformed image for display to the operator of the remotely controlled vehicle.

In one aspect, the system and method includes receiving an input from the operator for changing a configuration of the remotely controlled vehicle; transmitting, based on the input from the operator, one or more commands to the remotely controlled vehicle for changing the configuration of the remotely controlled vehicle; identifying, based on receiving the input from the operator, a last received image of the surroundings of the remotely controlled vehicle that was captured by the video camera prior to the transmission of the one or more commands to the remotely controlled vehicle; estimating the real-time position of the remotely controlled vehicle based on sensor data received from the vehicle; transforming the identified last received image into a retransformed image based on the estimated real-time position of the remotely controlled vehicle; and, outputting the retransformed image for display to the operator of the remotely controlled vehicle.

In one aspect, the system and method includes receiving depth map data for respective images captured by the video camera; and, transforming the respective images into respective transformed images based on the respective estimated real time positions of the remote controlled vehicle and the respective depth map data. In one aspect, the system and method includes transforming the respective images into the respective transformed images by computing an inverse orthographic projection for the respective images using the respective depth map data.

In one aspect, the system and method includes outputting, if the new image of the surroundings has not been received, an audio or visual warning to the operator in addition to outputting the retransformed image for display to the operator.

In one aspect, the system and method includes estimating the real-time position of the remotely controlled vehicle based on position data included within the sensor data received from the vehicle; and, further refining the estimated real-time position of the remotely controlled vehicle that was determined based on the position data using vehicle speed or vehicle direction data included within the sensor data.

BRIEF DESCRIPTION OF THE DRAWINGS

FIGS. 4-5 illustrate and example for transforming an image in accordance with an aspect of the disclosure.

DETAILED DESCRIPTION

Figure 1:
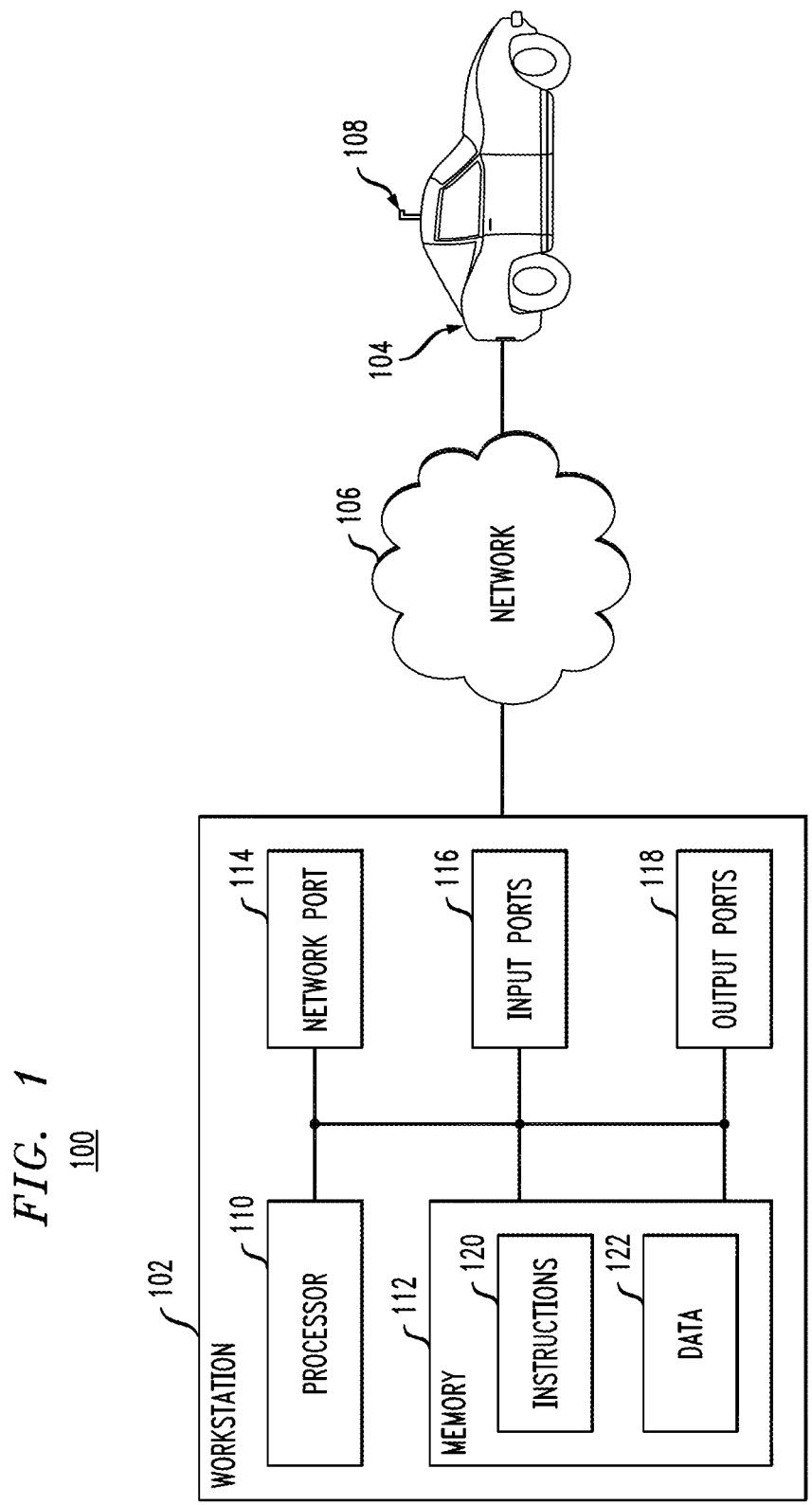
FIG. 1 illustrates a schematic example of a video processing and display system in accordance with an aspect of the disclosure.

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

As used herein, video latency (hereinafter, "latency") is the time interval between the time an image of the surroundings of a remotely controlled vehicle is captured by a video camera mounted on the vehicle and the time when the surroundings are displayed to an operator of the vehicle at a remote location. Typical values of video latency can range between 200 ms-600 ms or more, and can vary, for example, due to changes in network congestion or bandwidth.

An operator's ability to remotely control a vehicle from afar can be adversely affected by latency in two ways.

First, the surroundings of the vehicle displayed to the operator on the display may not correspond to the real-time surroundings of the vehicle, which makes it more difficult for the operator to control the vehicle effectively. This is typically most apparent when the vehicle is in motion.

Second, video latency can induce a very noticeable (and varying) lag between the time the operator initiates a change in a configuration of the vehicle (e.g., speed or direction), and the time that the operator sees the changed configuration reflected on the display. For example, if the operator manipulates a control device, such as a joystick, in order to command the vehicle to turn in a desired direction, video latency can aggravate the lag between the time the operator initiates the command and the time the operator sees the actual change in the direction of the vehicle reflected on the operator's display. Over time, command lag, i.e., lag perceptible to the operator between the time the operator initiates a command and the time at which a change in the configuration of the vehicle is presented to the operator on a display, can fatigue or disorient the operator while remotely operating the vehicle.

The present disclosure describes systems and methods that may increase the operator's ability to operate a remotely controlled vehicle despite latency, and, furthermore, reduce the fatigue and disorientation of the operator by materially reducing or eliminating command lag.

In various aspects, a workstation configured for remotely controlling a remotely controlled vehicle is provided. In various aspects, the workstation is configured to process and display images of the surroundings of the vehicle to an operator of the vehicle at a remote location.

In various aspects, the workstation is configured to receive a plurality of images captured by a video camera mounted on the remotely controlled vehicle, and to determine a position of the vehicle at the time a received image was captured by the video camera mounted to the vehicle.

In various aspects, the workstation is configured to estimate a real-time position of the vehicle, and to determine a difference between the estimated real-time position of the vehicle and the position of the vehicle when a received image was captured by the video camera.

In various aspects, the workstation is configured to transform a received image that was captured at a prior position of the vehicle into a transformed image based on the estimated real-time position of the vehicle, such that the transformed image approximates at least a portion of the video camera's view of the surroundings of the vehicle at the estimated real-time position, and to display the transformed image on a display to an operator.

In various aspects, the workstation is configured to receive an input or a command from an operator for changing a configuration of the remotely controlled vehicle from a prior configuration of the vehicle to a desired new configuration of the vehicle, and to transmit one or more commands to the vehicle for changing its configuration.

In various aspects, the workstation is configured to identify a previously received image that was received by workstation prior to the time the vehicle changed its configuration in response to the command, and to determine the position of the vehicle when the identified image was captured.

In various aspects, the workstation is configured to estimate a real-time position of the vehicle after the vehicle changed its configuration in response to the command.

In various aspects, the workstation is configured to transform the identified previously received image into a transformed image based on the estimated real-time position of the vehicle after the vehicle changed its configuration in response to the command, such that the transformed image represents at least a portion of the video camera's view of the surroundings of the vehicle at the estimated real-time position after the vehicle changed its configuration in response to the command, and to display the transformed image on a display to an operator.

These and other aspects are now described in further detail below with reference to the figures. FIG. 1 illustrates a schematic example of a system 100 that includes a workstation 102 for remotely controlling the operation of a vehicle 104 in accordance with various aspects of the disclosure.

As shown in FIG. 1, workstation 102 is communicatively interconnected with vehicle 104 via a network 106. Network 106 may be any type or combination of networks, such as a cellular network, satellite network, Wi-Fi network, Bluetooth network, etc. Network 106 may include a wireless network, a wired network, or a combination of wired or wireless networks. Network 106 may be configured as a local area network, a medium area network, or a wide area network, such as the Internet, or any combination thereof. The workstation 102, and the vehicle 104, may be configured to communicate data with each other using one or more network protocols, such as, for example, the ubiquitous packet-based TCP/IP network protocol, or other conventional network protocols.

Vehicle 104 is any type of remotely controllable vehicle, such as a land vehicle, air vehicle, or water vehicle. Vehicle 104 may include a vehicle control system (not shown) that is configured using hardware, software or a combination thereof to receive operational commands from the workstation 102 over the network 105 and to operate the vehicle in accordance with the operational commands. For example, vehicle 104 may be configured with propulsion means (e.g., an engine or a battery) for propelling the vehicle, steering means for controlling the direction of motion of the vehicle, acceleration or breaking means for accelerating or bringing the vehicle to a safe stop, and a variety of sensors (e.g., compass, gyroscope, accelerometer, GPS) for providing sensor data regarding the status of the vehicle, all of which may be integrated with or operate under the control of the vehicle control system. Sensor data may include, for example, information such as the position or location, speed, direction, acceleration, altitude, and fuel status of the vehicle.

As shown in FIG. 1, vehicle 104 includes a video camera 108 that is mounted at a suitable location on the vehicle 104 and operates under the control of the vehicle control system. The camera 108 may be mounted, for example, in a front-facing arrangement, such that the camera 108 provides a desired horizontal field view (e.g., 30 degree, 60 degree, 120 degree, etc.) of the surroundings in the front of the vehicle as the vehicle travels down a road, lane, or path in a forwardly direction. In some embodiments, vehicle 104 may include additional cameras 108 that are mounted on the vehicle to provide additional fields of view (e.g., overlapping or non-overlapping) of surroundings in the front, side, rear, above, or below the vehicle as it travels on a path. In some embodiments, the camera 108 may be a movable camera that may be mechanically panned or tilted in a desired direction. In various embodiments, the camera 108 may be a single lens camera, a multiple lens camera, or a stereo or depth camera. In various embodiments, camera 108 is configured, under the vehicle control system, to generate time-stamped, encoded, compressed frames of digitized images captured by the camera 108 in a desired video format, such as the FLV, MP2, MP4, H-264, Quicktime, or other well-known and conventional lossy or lossless image formats.

In the shown in example embodiment of FIG. 1, camera 108 is a stereo or depth-map camera configured to provide depth-map data associated with the pixels of the frames or images captured by the camera representing the surroundings of the vehicle. In various embodiments, vehicle 104 is configured to periodically transmit the depth-map data and the images captured by the camera 108 to the workstation 102 via the network 106. In addition, the vehicle 104 is also configured to transmit various sensor data regarding the status of the vehicle to the workstation 102 via the network 106, such as, for example, the speed, position, and direction of travel of the vehicle. In some embodiments, the sensor data is sent independently of the image data over a low latency link. Since the size of the sensor data will typically be much smaller than the size of the images, the sensor data may be received by the workstation 102 much more quickly and frequently than the images. In some embodiments, certain sensor data, such as, for example, GPS coordinates describing the position or location of the vehicle when an image was captured by the camera 108, may also be transmitted from the vehicle 104 to the workstation 102 as part of the transmitted images (e.g., as image meta-data).

As shown in the FIG. 1, in one example embodiment in accordance with various aspects of the disclosure, a workstation 102 is configured with a processor 110, a memory 112, a network communication port 114, one or more input ports 116, and one or more output ports 118 that are communicatively interconnected with each other via an internal bus. Workstation 102 may be a server, a personal computer, a laptop, a gaming device, a set-top device, or any computing device capable of receiving, transmitting, and processing data in accordance with various aspects of the disclosure. In various embodiments, workstation 102 may be configured with hardware, software, or combination thereof to implement various functionality and aspects disclosed herein.

Processor 110 may be a single-core or a multiple-core processor. In various embodiments, the processor 110 may be a microprocessor, a microcontroller, a digital signal processor (a.k.a. DSP), or any other type of conventional processor that is configured to execute instructions and process data (e.g., image or sensor data). Alternatively, the processor 110 may be implemented as a Field Programmable Gate Array (FPGA) or an application specific integrated chip (ASIC). Although FIG. 1 functionally illustrates the processor 110, memory 112, and other elements of computer workstation 110 as being within the same block, the processor and memory may be implemented as multiple processors and memories that are interconnected with each other.

The memory 112 stores information accessible by processor 110, including instructions 120 and data 122. The memory 112 may include one or more types of transitory or non-transitory memories for storing information accessible by the processor 102, such as non-transitory hard-drive, ROM, Flash, or other types of non-volatile memory, or, transitory random access memory (RAM) or other types of volatile memory.

Instructions 120 may include one or more executable program(s) or application(s) that are executed or otherwise processed by the processor 120 to implement various aspects of the present disclosure. The instructions 120 may be any set of instructions to be executed directly (such as machine code) or indirectly (such as interpreted code) by the processor. For example, the instructions may be stored as computer code on the computer-readable medium. In that regard, the terms "instructions" and "programs" may be used interchangeably herein. Instructions 120 may also include an operating system, device drivers, a graphical user interface, and other instructions or programs that are typically found on computing devices and enable a user to interact with and operate the workstation.

The data 122 may be retrieved, stored or modified by processor 110 in accordance with the instructions 120. The data may be stored in computer registers, in files having certain formats (e.g., image file format), tables, or data structures. The data may also be formatted in any computer readable format. Data 122 may be any data processed by the processor 110 in accordance with various aspects of the disclosure, such as data received or output by the workstation 102 or data processed or generated by the processor 110 in accordance with various aspects of the present disclosure. For instance, the data 122 may include image data, depth map data, sensor data, operator commands, etc.

The network communication port 114 is a network interface configured to enable network communications between the workstation 102 and the vehicle 104 over the network 106. The network communication port 114 may include one or more network adapters, which are configured to receive data from the vehicle (e.g., image data or sensor data) at the workstation 102 over the network 106 or to transmit data from the workstation 102 to the vehicle (e.g., operator commands, status commands, etc.) over the network 106. The network adapters may be configured to communicate over the network 106 using one or more network protocols.

The one or more input ports 116 include one or more input interfaces configured to receive input provided by the operator for controlling the operation of the remotely controlled vehicle. In various embodiments, for example, the one or more input ports 116 may include operator input devices such as a keyboard, mouse, joystick, steering wheel, pedals, gamepad, or other control device, that are manipulated by the operator for controlling and operating the vehicle remotely. The processor 110 may be configured to process the input received via the one or more input ports 116 into vehicle commands that are transmitted by the processor 110 via the network communication port 114 to the vehicle control system of the vehicle 104 to direct the operation of the vehicle from afar.

The one or more output ports 118 include one or more output interfaces for displaying data regarding the status and configuration of the remotely controlled vehicle 104 to the operator. For example, the one or more output ports 118 may include one or more display devices such as a LED or LCD display, a touch screen, or a head-mounted display. The processor 110 may be configured to display, on the one or more display devices and as part of a graphical user interface, the images of the surroundings of the vehicle, and other vehicle data that are received and processed by the workstation 102 from the vehicle 104, such as the speed, direction, position, altitude, or other sensor data relevant to the operation of the vehicle.

Figure 2:
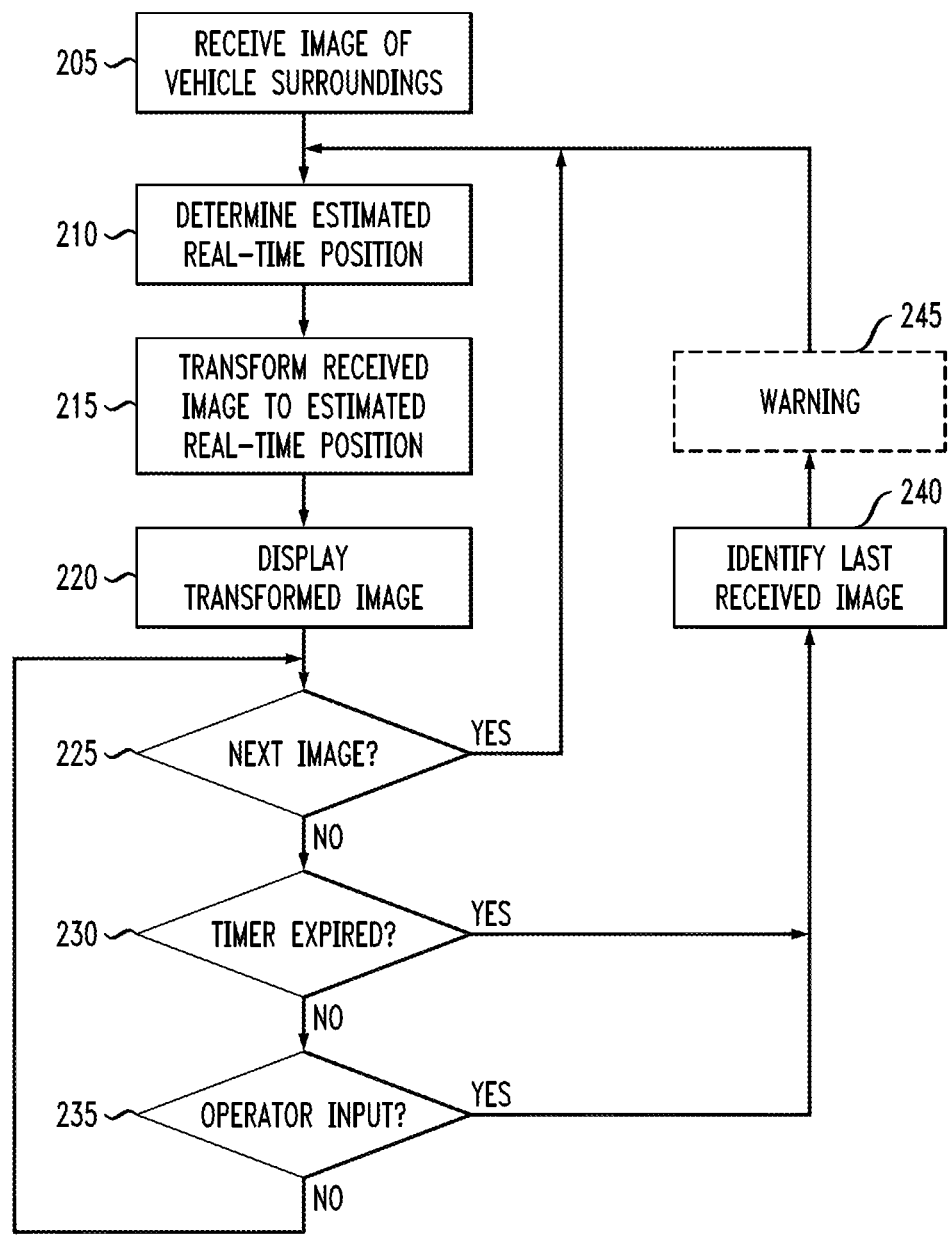
FIG. 2 illustrates an example of a process flow diagram implemented by the video processing and display system in accordance with an aspect of the disclosure.

FIG. 2 illustrates an example of a process flow diagram 200 for processing and displaying video images received by a workstation configured in accordance with an aspect of the disclosure from a remotely controlled vehicle.

Figure 3:
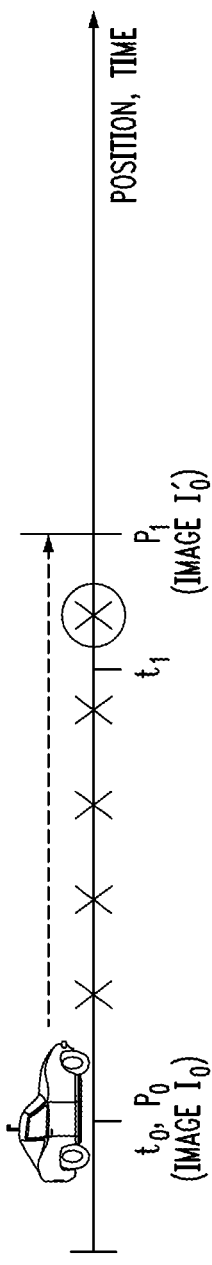
FIG. 3 illustrates an example operation of the video processing and display system in accordance with an aspect of the disclosure

In step 205, the process includes receiving a video image or frame of the surroundings of the remotely controlled vehicle. Referring to FIG. 3, for example, the video camera 108 mounted on the remotely controlled vehicle 104 may capture, at an initial time $t_0$, an image $I_0$ of the surroundings of the vehicle 104 at a vehicle position $P_0$. The captured image $I_0$ may be time-stamped with the time $t_0$, digitized, encoded, compressed, and transmitted over the network 106 to the workstation 102 by the vehicle 104. The captured image $I_0$ may be received at the workstation 102 at a later time $t_1$, due to the time it takes to prepare and transmit the image to the workstation 102 over the network 106 after the image was captured at time $t_0$ (e.g., typically 200 ms-600 ms or greater). The captured image $I_0$ received at the workstation 102 may include the position $P_0$ of the vehicle 104 at time $t_0$ when image $I_0$ was acquired (e.g., as part of the metadata of the image).

In step 210, the process includes determining the estimated real-time position of the remotely controlled vehicle. Referring to FIG. 3, for example, the processor 110 of the workstation 102 may determine that the position of the vehicle 104 at the time $t_0$ when the image $I_0$ was captured was position $P_0$ (e.g., from the metadata provided with image $I_0$), and that the estimated real-time position of the vehicle at the time image $I_0$ is processed at the workstation is position $P_1$. The processor 110 may estimate the real-time position $P_1$ of the vehicle 104 in various ways.

In one aspect, for example, the processor 110 may receive sensor data from the vehicle 104, where the sensor data includes frequent updates of the real-time position (e.g., GPS coordinates) of the vehicle 104 at various times after the time an image of the surroundings is captured by the video camera 108. The frequency at which the sensor data indicating the position (and other sensor data) of the vehicle 104 is received (in FIG. 3, X-markings indicate times when position, speed, direction data may be received at the workstation 102) may be greater than the frequency at which the images of surroundings of the vehicle are received at the workstation 102, thus enabling the processor 110, in one aspect, to use the latest reported real time position of the vehicle 104 (circled-X in FIG. 3) as the estimated real time position $P_1$ of the vehicle 104 at the time an image, such as image $I_0$, is processed by processor 110. Alternatively or in addition, in another aspect the processor 110 may also be configured to use the last reported or known real time position of the vehicle 104 (circled-X in FIG. 3) to further refine the estimated real time position of the vehicle based on other sensor data, such as the speed, direction, and altitude of the vehicle (indicated as $P_1$ in FIG. 3).

In step 215, the process includes transforming the image into a transformed image based on the estimated real time position of the vehicle, such that transformed image estimates at least a portion of the video camera 108's view of the surroundings of the vehicle at the estimated real time position of the vehicle. Referring to FIG. 3, for example, the processor 110 of the workstation 102 may transform the previously received image $I_0$ to an image $I_0'$ to represent the approximate at least a portion of the video camera view of the surroundings of the vehicle at the estimated real time position $P_1$. The transformation of image $I_0$ into image $I_0'$ is based on the difference between position $P_0$ where image $I_0$ was captured, and the estimated real time position $P_1$. Such transformation may include, for example, cropping portions of the image $I_0$, shifting image $I_0$, and/or rotating or warping image $I_0$.

In step 220, the process includes displaying the transformed image representing at least a portion of the estimated video camera view of the surroundings of the vehicle at the estimated real time position of the vehicle to a remote operator of the vehicle. For example, referring to FIG. 3, the processor 102 may output or present the transformed image $I_0'$ on a display to an operator via the output port 118.

In step 225, the process includes determining whether a new or another video image or frame of the surroundings of the remotely controlled vehicle has been received.

If a new video image or frame of the surroundings of the remotely controlled vehicle has been received, the process repeats steps 210 to 225 for the new image. Referring to FIG. 3, for example, video camera 108 may continue to capture images which are periodically transmitted from the vehicle 104 to the workstation 102. As the next images captured by the video camera are received at the workstation 102, the processor 110 may reiterate steps 210 to 225 in order to transform each received image to represent at least a portion of the estimated video camera 108's view of the surroundings of the vehicle at the estimated real time position of the vehicle, and display the transformed images on a display to the remote operator of the vehicle.

In some favorable circumstances, it may be possible that the workstation 102 receives a more recent image captured by the video camera 108 before a prior image received from the vehicle 104 has been transformed and displayed to the operator. This may occur, for example, where two images captured by the video camera 108 are received at the workstation 102 over the network 106 within, for example, an unexpectedly short time interval (e.g., less than about a 50 ms interval) as a result of a favorable reduction in network congestion or some other reason that results in a sharp reduction in network latency. In such circumstances, the processor 110 may be configured to drop the prior (e.g., earlier in time) image, and to execute steps 210 to 225 with the most recent image that is received by the workstation 102, or to display the earlier image to the operator without executing steps 210 to 225, as appropriate.

As will be apparent from the foregoing, the present disclosure describes systems and methods that are configured to estimate and display at least a portion of the real-time surroundings of a remotely controlled vehicle to an operator despite the presence of typical amounts of video latency.

The next steps of the process 200 discussed below address additional aspects of the disclosure, including an aspect where one or more of the newly captured images of the surroundings of the vehicle are lost or inordinately delayed, and are not received by the workstation 102 in a predetermined timely manner, and an aspect that is directed to reducing or eliminating command lag, i.e., the lag that is perceptible to the operator between the time the operator initiates a command and the time at which a change in the configuration of the remotely controlled vehicle is presented to the operator on a display, which can lead to fatigue or disorientation of the operator while remotely operating the vehicle.

Returning to process 200, if the check at step 225 indicates that the new video image or frame of the surroundings of the remotely controlled vehicle has not been received, the process continues to another check in step 230.

In step 230, the process 200 includes determining whether a predetermined timer setting a designated time period for receiving a new image or frame of the surroundings of the remotely controlled vehicle has expired. The predetermined timer setting may be a static setting or a dynamic setting that is determined based on the desired frame refresh rate. Thus, the timer setting may be statically set to, for example, 33 ms, 50 ms, 100 ms or any such value based on the desired frame refresh rate. Alternatively or in addition, the timer value may be dynamically adjusted based on the frequency at which the video images are captured at the video camera 108 and the frequency at which they are actually received at the workstation 102. Thus, for example, the timer setting may initially be set to a high value, e.g., 100 ms, which may then be reduced if the frequency at which the video images are received at the workstation drops below a desired frame rate due to network congestion or other reasons.

If the timer has expired prior to receiving a new image, then the process 200 may be configured, in step 240, to identify the last or most recent image that was received at the workstation 102, and to reiterate steps 210 to 225 using the identified last or most recent previously received image. In this manner, the workstation 102 may be configured to show the operator at least a portion of the estimated view of the video camera 108 at the estimated real time position of the vehicle using the last and most recent prior image when a new image is not received (e.g., lost) at the workstation 102 within the desired time frame. An audible or visual warning may also be provided to the operator (step 245) to alert the operator that the transformed image being shown to the operator is based on an previously received image that has already been transformed at least one before and presented to the operator.

If the timer has not expired, the process 200 continues to another check in step 235.

In step 235, the process 200 includes determining whether an operator initiated change in the configuration of the vehicle has been received. For example, the operator may initiate a change in the configuration of the remotely controlled vehicle by manipulating a control device, such as a joystick or a pedal to control and change the direction or speed of the vehicle.

If an operator input to change the configuration of the remotely controlled vehicle has not been received, the process returns to step 225.

If an operator input to change the configuration (e.g., direction, speed, etc.) of the remotely controlled vehicle has been received, then the processor 110 may receive the operator's input via the one or more input ports 116, and translate the input into commands that are transmitted from the workstation 102 to the remotely controlled vehicle 104 over the network 108.

The processor 110 may then be configured, in step 240, to identify the most recent prior image that was received at the workstation 102 from the video camera 108, and to reiterate steps 210 to 225 using this identified previously received image. In this manner, the workstation is configured to transform identified previously received images into transformed images based on the estimated real-time position of the vehicle after the command is transmitted to the vehicle 104, and to display the transformed images on the display to the operator. It can be seen that since the transformed images represent at least a portion of the estimated video camera 108's view of the surroundings of the vehicle after the vehicle changes its configuration in response to the command (and before all of the images representing the changes in the configuration are received at the workstation due to the latency), this approach may potentially greatly reduce the command lag experienced by the operator.

In other words, this aspect of the disclosure takes advantage of the greater frequency of reception and the lower latency of the much smaller position sensor data (as opposed to the typical data size of the images) that are received from the vehicle as it changes its configuration in response to the operator's commands, and uses the sensor data to transform received images into transformed images that are displayed to the operator much more quickly to represent the changing configuration of the vehicle, thus providing much faster visual interactive feedback to the operator in response to operator's commands and reducing the incidences of command lag experienced by the operator.

As will be understood by those of ordinary skill in the art, there are a number of ways of transforming an image that was captured from one point of view into a transformed image represented from another point of view. One approach to achieving such transformation is to consider the image from the reference point of a depth-map video camera mounted on the remotely controlled vehicle.

An inverse orthographic projection may be computed on the received image using the depth map to create an array of color $C(r, g, b)$ image values together with the Cartesian coordinate $P(x, y, z)$ tuple-points that are determined from the depth map. That is, based on the depth map information, the three-dimensional Cartesian coordinates of each pixel location may be calculated, as will be understood by those with ordinary skill in the art.

Figure 4:
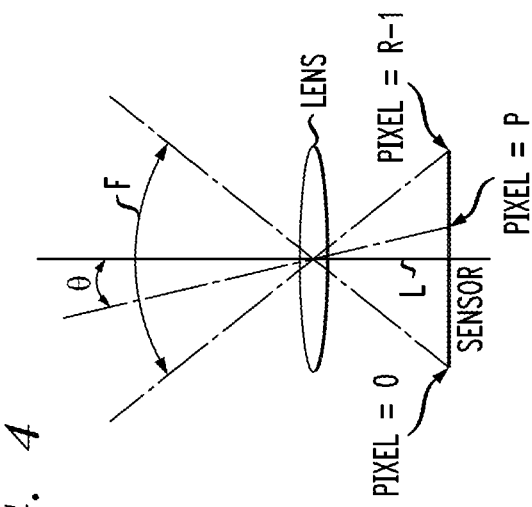

For example, assuming that the video camera has a pixel resolution of $Rx$ by $Ry$, and an angular field of view of $Fx$ and $Fy$, where X and Y represent the horizontal and vertical axes with (see FIG. 4), the angle $\theta_x$ represented by the pixel with index $P_x$ can be calculated by $$\tan\left(\frac{F_x}{2}\right) = \frac{L}{R_x/2}$$

$$\tan(\theta_x) = \frac{L}{P_x - R_x/2}$$

$$\Rightarrow \tan(\theta_x) = \frac{R_x \cdot \tan\left(\frac{F_x}{2}\right)}{2P_x - R_x}$$

and similarly for the y component.

Given these angles from the video camera to the point and the distance (D) from the video camera to the point, the location of the point relative to the camera P(x, y, z) can be determined as (see FIG. 5):

$$x = D \cdot \sin(\theta_x)$$

$$y = D \cdot \sin(\theta_y)$$

$$z = D \cdot \cos(\theta_x) \cdot \cos(\theta_y)$$

A three-dimensional translation matrix T of the video camera (estimated based on the video camera specifications) in Cartesian space relative to the position of the video camera when the image was captured may be subtracted from the coordinate of each P(x, y, z) tuple-point.

$$P' = P - T$$

A three-dimensional rotation matrix of the camera in Euler angles ($\alpha$, $\beta$, $\gamma$) relative to the orientation of the video camera at the position where the image was captured by the video camera may be negated and applied to the coordinate of each tuple-point:

$$P'' = P' \cdot R$$

where, the rotation matrix R is given by the Euler angles corresponding to pitch, yaw and roll:

$$R = X(-\alpha)Y(-\beta)Z(-\gamma)$$

and, where:

$$X(-\alpha) = \begin{bmatrix} 1 & 0 & 0 \\ 0 & \cos(-\alpha) & -\sin(-\alpha) \\ 0 & \sin(-\alpha) & \cos(-\alpha) \end{bmatrix}$$

$$Y(-\beta) = \begin{bmatrix} \cos(-\beta) & 0 & \sin(-\beta) \\ 0 & 1 & 0 \\ -\sin(-\beta) & 0 & \cos(-\beta) \end{bmatrix}$$

$$Z(-\gamma) = \begin{bmatrix} \cos(-\gamma) & -\sin(-\gamma) & 0 \\ \sin(-\gamma) & \cos(-\gamma) & 0 \\ 0 & 0 & 1 \end{bmatrix}$$

The distances from the estimated new reference point of view to the new coordinates of each tuple-point may calculated as:

$$D = \sqrt{x^2 \pm y^2 \pm z^2}$$

An orthographic projection may then be computed on each tuple-point to calculate the new pixel locations for each tuple-point based on the new coordinates.

A transformed image may be computed by setting the color value for each new pixel location of each tuple-point to the color value of the tuple-point. If two tuple-points refer to the same pixel location, the tuple-point with the smallest distance from the reference point of the camera to the three-dimensional Cartesian coordinates of the tuple-point may be used.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. An apparatus for processing and displaying video images captured by a video camera mounted on a remotely controlled vehicle, the apparatus comprising:
 a processor configured to determine whether a new image captured by the video camera of the surroundings of the remotely controlled vehicle has been received;
 when the new image of the surroundings has been received, the processor is further configured to:
  estimate a first real-time position of the remotely controlled vehicle based on sensor data received from the vehicle;
  transform the new image of the surroundings into a first transformed image of the surroundings based on the estimated first real-time position of the remotely controlled vehicle; and,
  output the first transformed image of the surroundings for display to an operator of the remotely controlled vehicle; and,
 when the new image of the surroundings has not been received, the processor is further configured to:
  identify a previously received image of the surroundings of the remotely controlled vehicle that was previously transformed and output for display to the operator;
  estimate a second real-time position of the remotely controlled vehicle based on sensor data received from the vehicle;
  retransform the previously received image into a second transformed image based on the estimated second real-time position of the remotely controlled vehicle;
  output the second transformed image for display to the operator of the remotely controlled vehicle; and,
  output an audio or visual warning indicating that the second transformed image output for display to the operator is based on a previously received image that was previously transformed and output for display to the operator at a prior time.

2. The apparatus of claim 1, wherein the processor is further configured to:
 receive an input from the operator for changing a configuration of the remotely controlled vehicle;
 transmit, based on the input from the operator, one or more commands to the remotely controlled vehicle for changing the configuration of the remotely controlled vehicle;
 identify, based on receiving the input from the operator, a last received image of the surroundings of the remotely controlled vehicle that was captured by the video camera prior to the transmission of the one or more commands to the remotely controlled vehicle;

estimate a third real-time position of the remotely controlled vehicle based on sensor data received from the vehicle;

retransform the identified last received image into a third transformed image based on the estimated third real-time position of the remotely controlled vehicle; and, output the third transformed image for display to the operator of the remotely controlled vehicle and output an audio or visual warning indicating that the third transformed image output for display to the operator is based on a last received image that was previously transformed and output for display to the operator at a prior time.

3. The apparatus of claim 1, wherein the processor is further configured to:

receive depth map data for respective images captured by the video camera; and, transform the respective images received by the processor into respective transformed images based on respective estimated real time positions of the remote controlled vehicle and the respective depth map data.

4. The apparatus of claim 3, wherein the processor is further configured to transform the respective images received by the processor into the respective transformed images by performing an inverse orthographic projection on the respective images using the respective depth map data.

5. The apparatus of claim 1, wherein the processor is further configured to estimate the real-time positions of the remotely controlled vehicle based on position data included within the sensor data received from the vehicle.

6. The apparatus of claim 5, wherein the processor is further configured to further refine the estimated real-time positions of the remotely controlled vehicle using vehicle speed or vehicle direction data included within the sensor data.

7. A method for processing and displaying video images captured by a video camera mounted on a remotely controlled vehicle, the method comprising:

determining whether a new image captured by the video camera of the surroundings of the remotely controlled vehicle has been received;

when the new image of the surroundings has been received, then:

estimating a first real-time position of the remotely controlled vehicle based on sensor data received from the vehicle;

transforming the new image of the surroundings into a first transformed image of the surroundings based on the estimated first real-time position of the remotely controlled vehicle; and, outputting the first transformed image of the surroundings for display to an operator of the remotely controlled vehicle; and, when the new image of the surroundings has not been received, then:

identifying a previously received image of the surroundings of the remotely controlled vehicle that was previously transformed and output for display to the operator;

estimating a second real-time position of the remotely controlled vehicle based on sensor data received from the vehicle;

retransforming the previously received image into a second transformed image based on the estimated second real-time position of the remotely controlled vehicle;

outputting the second transformed image for display to the operator of the remotely controlled vehicle; and, outputting an audio or visual warning indicating that the second transformed image output for display to the operator is based on a previously received image that was previously transformed and output for display to the operator at a prior time.

8. The method of claim 7, the method further comprising:

receiving an input from the operator for changing a configuration of the remotely controlled vehicle;

transmitting, based on the input from the operator, one or more commands to the remotely controlled vehicle for changing the configuration of the remotely controlled vehicle;

identifying, based on receiving the input from the operator, a last received image of the surroundings of the remotely controlled vehicle that was captured by the video camera prior to the transmission of the one or more commands to the remotely controlled vehicle;

estimating a third real-time position of the remotely controlled vehicle based on sensor data received from the vehicle;

retransforming the identified last received image into a third transformed image based on the estimated third real-time position of the remotely controlled vehicle; and, outputting the third transformed image for display to the operator of the remotely controlled vehicle and outputting another audio or visual warning indicating that the third transformed image output for display to the operator is based on a previously received image that was previously transformed and output for display to the operator at a prior time.

9. The method of claim 7, wherein the method further comprises:

receiving depth map data for respective images captured by the video camera; and, transforming the respective images into respective transformed images based on respective estimated real time positions of the remote controlled vehicle and the respective depth map data.

10. The method of claim 9, wherein the method further comprises transforming the respective images into the respective transformed images by computing an inverse orthographic projection for the respective images using the respective depth map data.

11. The method of claim 7, the method further comprising estimating the real-time positions of the remotely controlled vehicle based on position data included within the sensor data received from the vehicle.

12. The method of claim 11, the method further comprising refining the estimated real-time positions of the remotely controlled vehicle using vehicle speed or vehicle direction data included within the sensor data.

13. A non-transitory computer-readable medium storing one or more executable instructions for processing and displaying video images captured by a video camera mounted on a remotely controlled vehicle, the one or more executable instructions, when executed by a processor, configuring the processor for:

determining whether a new image captured by the video camera of the surroundings of the remotely controlled vehicle has been received by the processor;

when the new image of the surroundings has been received, then:

estimating a first real-time position of the remotely controlled vehicle based on sensor data received from the vehicle;

transforming the new image of the surroundings into a first transformed image of the surroundings based on the estimated first real-time position of the remotely controlled vehicle; and, outputting the first transformed image of the surroundings for display to an operator of the remotely controlled vehicle; and, when the new image of the surroundings has not been received, then:

identifying a previously received image of the surroundings of the remotely controlled vehicle that was previously transformed and output for display to the operator;

estimating a second real-time position of the remotely controlled vehicle based on sensor data received from the vehicle;

retransforming the previously received image into a second transformed image based on the estimated second real-time position of the remotely controlled vehicle;

outputting the second transformed image for display to the operator of the remotely controlled vehicle; and, outputting an audio or visual warning indicating that the second transformed image output for display to the operator is based on a previously received image that was previously transformed and output for display to the operator at a prior time.

14. The non-transitory computer-readable medium of claim 13, the one or more stored executable instructions, when executed by the processor, further configuring the processor for:

receiving an input from the operator for changing a configuration of the remotely controlled vehicle;

transmitting, based on the input from the operator, one or more commands to the remotely controlled vehicle for changing the configuration of the remotely controlled vehicle;

identifying, based on receiving the input from the operator, a last received image of the surroundings of the remotely controlled vehicle that was captured by the video camera prior to the transmission of the one or more commands to the remotely controlled vehicle;

estimating the real-time position of the remotely controlled vehicle based on sensor data received from the vehicle;

transforming the identified last received image into a retransformed image based on the estimated real-time position of the remotely controlled vehicle;

outputting the retransformed image for display to the operator of the remotely controlled vehicle and outputting another audio or visual warning indicating that the third transformed image output for display to the operator is based on a previously received image that was previously transformed and output for display to the operator at a prior time.

15. The non-transitory computer-readable medium of claim 13, the one or more stored executable instructions, when executed by the processor, further configuring the processor for:

receiving depth map data for respective images captured by the video camera; and, transforming the respective images into respective transformed images based on respective estimated real time positions of the remote controlled vehicle and the respective depth map data.

16. The non-transitory computer-readable medium of claim 15, the one or more stored executable instructions, when executed by the processor, further configuring the processor for:

transforming the respective images into the respective transformed images by computing an inverse orthographic projection for the respective images using the respective depth map data.

17. The non-transitory computer-readable medium of claim 13, the one or more stored executable instructions, when executed by the processor, further configuring the processor for:

estimating the real-time positions of the remotely controlled vehicle based on position data included within the sensor data received from the vehicle; and, refining the estimated real-time positions of the remotely controlled vehicle using vehicle speed or vehicle direction data included within the sensor data.

* * * * *